United States Patent Office 3,065,230
Patented Nov. 20, 1962

3,065,230
AZABICYCLOHEXANES AND METHOD OF PREPARING THEM
Richard Baltzly, Tuckahoe, N.Y., Peter Byrom Russell, Bryn Mawr, Pa., and Nariman Bomanshaw Mehta, White Plains, N.Y., assignors to Burroughs Wellcome & Co. (U.S.A.) Inc., Tuckahoe, N.Y., a corporation of New York
No Drawing. Filed Mar. 16, 1959, Ser. No. 799,475
7 Claims. (Cl. 260—247.1)

The present invention relates to a group of 3-azabicyclo-(3:1:0)hexanes having the formula:

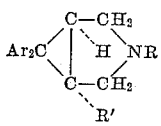

in which Ar is a phenyl radical and $Ar_2$ may also be o-biphenylene, R' is a lower alkyl radical, conveniently methyl, or hydrogen, and R is a lower alkyl radical or benzyl or hydrogen. Also embraced in the invention are the acid addition salts of these bases and their quaternary ammonium salts. The latter are represented by the formula:

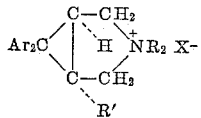

in which Ar and R' have the same values as before, R is a lower alkyl group and $NR_2$ represents also a heterocyclic ring having fixe to six members and selected from the class consisting of piperidine, pyrrolidine, morpholine and N'-alkylpiperazine.

These compounds have marked and valuable properties as analgesics. The quaternary salts have also spasmolytic properties. The acid used to prepare the acid addition salts does not contribute to the physiological action, neither does the anion of an acid present in the quaternary salts. Therefore, salts of all pharmacologically non-toxic acids are considered equivalent and to be embraced in the invention. Such acids are hydrochloric, sulfuric, phosphoric, hydrobromic, hydriodic, acetic, malic, citric, succinic, fumaric acids and the like. For most purposes, the hydrohlorides of the tertiary and secondary bases are quite satisfactory. With the quaternary ammonium salts, it is most convenient to employ an anion introduced in the alkylation. As will be seen, in one line of preparation the salts obtained are those of p-toluene-sulfonic acid. Since this acid is known to be physiologically inert and since the salts usually have convenient physical properties, these tosylates are especially prefered.

The compounds of this invention can be prepared by two routes which partly supplement each other, as is shown in the chart.

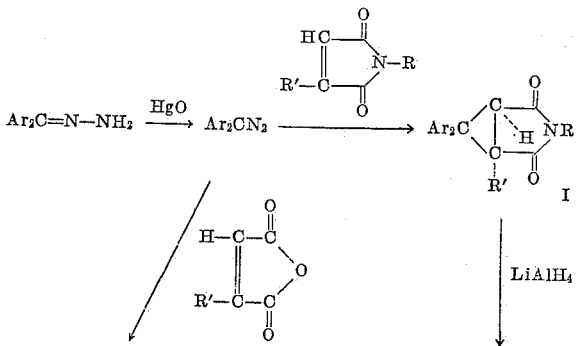

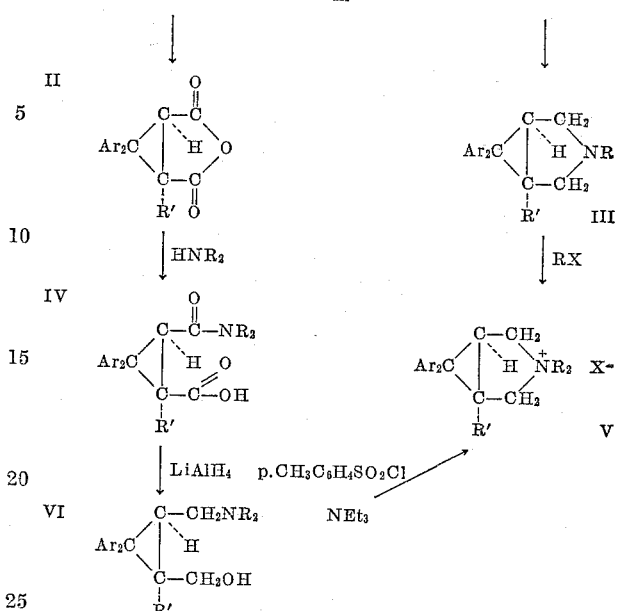

The amino-alcohols, VI, are the subject of our copending patent application No. 757,179 and their preparation is described therein.

The route through I and III is preferable for preparing the tertiary bases, and satisfactory for preparing quaternary salts (V) when $NR_2$ is not cyclic. For those types wherein $NR_2$ is a ring, the route through VI is preferable. This reaction (VI→V) is rather interesting chemically. It seems probable that the toluene sulfonyl chloride reacts first to form a sulfonate ester, VII, but we have not been able to isolate such a substance.

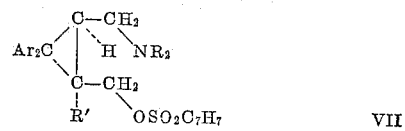

VII

Cyclization by an intramolecular displacement reaction by the nitrogen attacking the carbon atom that bears the tosylate radical would be expected theoretically and this is apparently so rapid that only the quaternary salt is obtained. In such a reaction the quaternary salt remains after removal of excess tri-ethyl amine together with one equivalent of that amine and one equivalent each of tosylate and chloride ions. The quaternary tosylate, however, is readily obtained either by crystallization from water, by shaking with silver tosylate, or by heating in a high vacuum (whereby tirethylamine hydrochloride is removed by sublimation). Still another separation is accomplished by solution in acetone in which many of the quaternary tosylates are soluble while triethylamine hydrochloride is not.

The use of triethylamine in the step VI→V is convenient, but other tertiary bases of similar basicity are equivalent though they offer no advantages. Markedly weaker bases such as pyridine are inferior, presumably in part because in the presumed intermediate VII, the amino moiety is not free, being bound by the hydrogen chloride during esterification of the hydroxyl group. It is also possible that the stronger base assists in the reaction of toluene sulfonyl chloride with the hydroxyl group.

Other sulfonyl chlorides than that of toluene may be employed in the step VI→V. For example, benzene sulfonyl chloride, p-bromobenzene sulfonyl chloride, methane sulfonyl chloride or ethane sulfonyl chloride react in the same way. However, p-toluene sulfonyl chloride is inexpensive and the derived acid is known to have low toxicity consequently there is seldom any advantage in using any of the above mentioned equivalents.

The secondary bases (III, R=H) may be prepared from the N-benzyl tertiary bases (III; R=CH$_2$C$_6$H$_5$) by catalytic debenzylation, preferably with palladized charcoal.

Alternatively, the diaryldiazomethane may be reacted with N-carbamyl maleimide and the resultant product reduced with lithium aluminum hydride to the secondary amino compound:

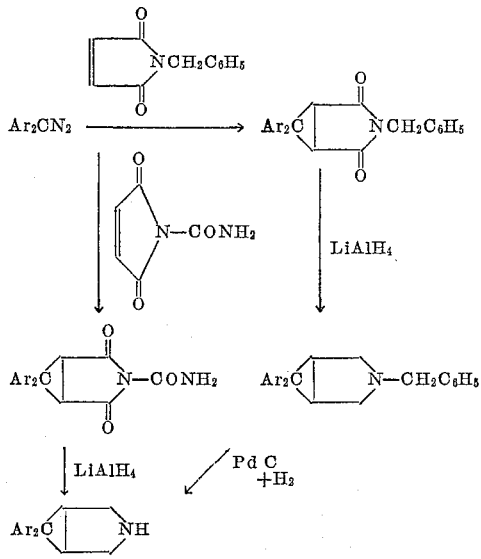

EXAMPLE 1

*6,6-Diphenyl-2,4-Diketo-3-(Methyl-3-Azabicyclo(3,1,0)-Hexane*

Diphenyldiazomethane (from 10 g. benzophenone hydrazone) in ether was added to a solution of N-methyl-maleimide (5 g.) in ether (50 ml.). After 1½ hours a mass of colorless needles separated. This was collected the next day (10.8 g.) and on heating at about 100° they exploded mildly. The residue was recrystallized from benzene-hexane; it formed plates M.P. 156°.

EXAMPLE 2

*6,6-Diphenyl-3,3-Dimethyl-3-Azabicyclo-(3,1,0)-Hexane Picrate*

Cis - 1,1-diphenyl-2-dimethylaminomethyl-3-hydroxymethylcyclopropane (1.4 g.) was treated with p-toluene sulfonyl chloride (.95 g.) in dry pyridine (5 ml.). The mixture was warmed for 1 week on the steam bath. At the end of this period, the excess pyridine was removed in vacuo and the residue dissolved in aqueous ethanol (50 ml. of 50%). This solution was then allowed to run through a column of Rohm and Haas IRA 400 resin (5 g.) which had been treated previously with sodium hydroxide solution (100 ml. of 10%) and washed well with the same volume of water and finally 50% ethanol. The solution from the column was evaporated in vacuo to remove the alcohol; any unchanged amino alcohol which separated was extracted with ether and the aqueous solution evaporated to dryness at room temperature. The resinous quaternary hydroxide was dissolved in methanol (10 ml.) and a saturated solution of picric acid added. The product separated at once and was recrystallized from methanol when it melted at 165° (1.4 g.).

EXAMPLE 3

*6,6-Diphenyl-2,4-Diketo-3-Ethyl-3-Azabicyclo-(3,1,0)-Hexane*

Prepared by reacting diphenyldiazomethane and N-ethyl maleimide as in Example 2. The product, after loss of nitrogen, crystallized from benzene-hexane in plates M.P. 194–195°.

EXAMPLE 4

*6,6-Diphenyl-3,3-Spiropentamethylene-3-Azabicyclo-(3,1,0)-Hexane Picrate*

Cis - 1,1-diphenyl-2-piperidinomethyl-3-hydroxymethyl-cyclopropane (1 g.) was treated with tosyl chloride in pyridine exactly as in Example 2. The quaternary hydroxide, isolated by the IRA 400 technique previously described was converted to the picrate (0.3 g.). The picrate crystallized from methanol in bright yellow prisms, M.P. 153°.

EXAMPLE 5

*6,6-Diphenyl-3,3-Spiropentamethylene-1-Methyl-3-Azabicyclo-(3,1,0)-Hexane*

1,1 - Diphenyl-2-piperidinomethyl-3-hydroxymethyl-3-methyl cyclopropane (1.67 g.) was treated with tosyl chloride (.95 g.) in pyridine (10 ml.) as described previously. The recovered base amounted to 1.5 g.; the quaternary hydroxide gave a picrate (0.1 g.) which separated from ethanol in prisms M.P. 174–175°.

EXAMPLE 6

*6,6-Bis-(p-Methoxyphenyl)-2,4-Di-Keto-3-Ethyl-3-Azabicyclo-(3:1:0)-Hexane*

Ten g. of 4,4'-dimethoxy benzophenone hydrazone was dissolved in 300 cc. of ether and shaken with 12 g. of yellow mercuric oxide. When the depth of the developing purple color of the solution seemed to be constant (about 4 hours) the solution was filtered and added to 5 g. of N-ethyl maleimide in 1 l. of hexane. After 1 hour the solution was colorless and colorless needles were deposited. These melted at 117° wtih evolution of gas and were probably the pyrazoline. After crystallization from benzene-hexane mixture the M.P. was 136° and analysis was correct for the azabicyclo hexane.

EXAMPLE 7

*6,6-Bis-(p-Methoxyphenyl)-2,4-Di-Keto-3-Methyl-3-Azabicyclo-(3:1:0)-Hexane*

Bis - (p-methoxyphenyl)-diazomethane was prepared from 15 g. of the hydrazone and 18 g. of mercuric oxide. The filtered solution was added to 7 g. of N-methyl-maleimide in ether (total volume 1.5 l.) and the reaction mixture was refluxed on the steam-bath. After 7 minutes the color of the diazo compound had faded. On the addition of hexane, colorless needles were deposited. These melted at 107° with decomposition and are presumed to have been the pyrazoline. When an attempt was made to recrystallize this solid from benzene-hexane, only oily material was obtained. A more satisfactory procedure was to dissolve the substance in toluene, reflux two hours and then remove the toluene in vacuo. The residue, after crystallization from ether-hexane, melted at 80–82° and had the correct composition for the desired aza-bicyclohexane.

EXAMPLE 8

*6,6-o-Biphenylene-2,4-Di-Keto-3-Methyl-3-Azabicyclo-(3:1:0)-Hexane*

9-diazofluorene was prepared from 10 g. of fluorenone hydrazone and the filtered solution of the diazo compound was reacted wtih 7 g. of N-methyl-maleimide in ethanol solution. After ten minutes refluxing on the steam-bath, colorless crystals appeared; wt. 11.7 g. These melted at 261° after crystallization from benzene-hexane but analysis showed the material to be mainly pyrazoline. Conversion to the azabicyclohexane could be accomplished either by heating to 260°, by refluxing in toluene for two hours, or, most satisfactorily, by refluxing in xylene for about 20 minutes. By both these last procedures the product crystallized from the solvent on cooling and was substantially pure as so obtained. M.P. 262°. It can be sublimed at about 140° at 0.5μ pressure.

EXAMPLE 9

6,6-p-Tolyl-2,4-Dioxo-3-Methyl-3-Azabicyclo-(3:1:0)-Hexane

To a solution of 11.3 g. (0.100 mole) of N-methyl maleimide in 0.5 liter of hexane and 0.5 liter of anhydrous ether was added a solution of 11 g. (0.05 mole) of 4,4′-dimethyldiphenyldiazo methane in 312 ml. of anhydrous ether. The mixture was stirred rapidly for 0.75 hr. when the color was completely discharged and a voluminous white precipitate appeared. The solution was filtered and the product collected, M.P.=110–12° C. with evolution of gas. Yield, 7 g.=42%. The product was recrystallized three times from boiling ether. M.P.=122° C. with evolution of gas. The product was identified by analysis as a pyrazoline of the following structure:

[Structure: pyrazoline with p-CH₃-C₆H₄ groups, N-CH₃, C=O]

7 g. of this pyrazoline was dissolved in 100 ml. of xylene and refluxed overnight. The solvent was blown off and the product crystallized from benzene/Et₂O. After three further crystallizations a product, M.P.=136–7° C., was obtained.

EXAMPLE 10

6,6-Bis-(p-Chlorophenyl)-2,4-Dioxo-3-Ethyl-3-Azabicyclo(3:1:0)-Hexane

To a solution of 2 g. (0.0079 mole) of 4,4′-dichlorodiphenyldiazomethane dissolved in 50 ml. of anhydrous ether was added 1 g. (0.008 mole) of N-ethylmaleimide. The solution was refluxed with rapid agitation for 3 hours. A precipitate appeared within 1 minute of addition. It was filtered and washed with dry ether. M.P.=131–2° C. with evolution of gas. Possibly the pyrazoline of the structure:

[Structure with Cl-phenyl groups, N-C₂H₅, M.P.=131–2° C.]

Two g. of the pyrazoline was dissolved in xylene and refluxed for 6 hours. On concentrating the solution a product M.P.=176–7° C. was obtained. Yield 1.6 g. Recrystallized from pentane-benzene:20/80 mixture it melted at 174–5° C.

EXAMPLE 11

6,6-Diphenyl-3-Butyl-2,4-Diketo-3-Azabicyclo-(3:1:0)-Hexane

To 8 g. (0.052 mole) of n-butylmaleimide dissolved in 100 ml. of diethylether, 10 g. of diphenyldiazomethane dissolved in 350 ml. of anhydrous ether was added. After 4 hours the solution was completely decolorized to a pale straw yellow tint. n-Pentane was added when a white precipitate was obtained. Yield 45%, M.P.=274–5° C. This was the pyrazoline. On heating the pyrazoline in boiling xylene for 1.5 hours, cubic crystals of the product were obtained. Recrystallized from boiling benzene, it melted at 196–7° C.

EXAMPLE 12

6,6-o-Biphenylene-3-Methyl-3-Azabicyclo(3:1:0)Hexane

To a rapidly stirred solution of 5 g. (0.133 mole) of LiAlH₄ in 500 ml. of anhydrous ether, 9 g. (0.033 mole) of 6,6-o-biphenylene-2,4-dioxo-3-methyl-3-azabicyclo(3:1:0)hexane (from Example 8) was dropped portionwise from a powder funnel. After refluxing for 24 hours, the excess reagent was decomposed by water, and the base extracted with an additional 200 ml. of ether. The combined ethereal layers were dried over anhydrous potassium carbonate. On evaporation of the solvent, a crystalline product was obtained. Recrystallization from ether-hexane gave 7.4 g. (91%) M.P. 146° C.

EXAMPLE 13

6,6-o-Biphenylene-3-Methyl-3-Azabicyclo(3:1:0)Hexane Methyl-Tosylate

To 1 g. of the base, 6,6-o-biphenylene-3-methyl-3-azabicyclo(3:1:0)hexane (Example 12) dissolved in 25 ml. of methanol was added 1 g. of methyl-p-toluene sulfonate and the solution was warmed on the steam bath for 10 minutes. On leaving it at room temperature overnight, the crystals were deposited. On addition of ether, more crystals separated out. Recrystallization from hot acetone gave 1 g. of fine needles, M.P. 182° C.

EXAMPLE 14

6,6-Diphenyl-3-Ethyl-3-Azabicyclo(3:1:0)Hexane

To a slurry of 3 g. (0.088 mole) of LiAlH₄ in 300 ml. of anhydrous ether, 5 g. (0.017 mole) of 6,6-diphenyl-3-ethyl-2,4-dioxo-3-azabicyclo(3:1:0)hexane was added portionwise from a powder funnel. The reaction mixture was stirred rapidly for a duration of 16 hrs. at room temperature. The excess reagent was decomposed by water and the free base extracted with an additional 200 ml. portion of ether. The ethereal solution of the base was dried over anhydrous potassium carbonate and evaporated to dryness. The free base was distilled, M.P. 90–100° C. (bath temperature) under 0.2 mm. of mercury pressure. The 4 g. of pure product, on standing, solidified. After recrystallization from a mixture of ether-hexane, it melted at 59° C. This base forms a bitartrate that crystallizes as a monohydrate, M.P. 95–100° C. with effervescence.

EXAMPLE 15

6,6-Diphenyl-3-Ethyl-3-Azabicyclo(3:1:0)Hexane Ethyl-Tosylate

To 1.3 g. of the base, 6,6-diphenyl-3-ethyl-3-azabicyclo(3:1:0)hexane (Example 14) dissolved in 5 ml. of acetone was added 1 g. of ethyl-p-toluenesulfonate and the solution warmed on the steam bath for 30 minutes. On standing overnight at room temperature 1.8 g. of crystals separated. After recrystallization from methanol ether, this salt formed fine needles, M.P. 154° C.

EXAMPLE 16

6,6-Diphenyl-3,3-Diethyl-3-Azabicyclo(3:1:0)Hexane Iodide

The base from Example 14 on treatment with ethyl iodide gave the above iodide, M.P. 204° C.

EXAMPLE 17

6,6-o-Biphenylene-3-Ethyl-3-Azabicyclo(3:1:0)Hexane

The cyclic imide, 6,6-o-biphenylene-2,4-dioxo-3-ethyl-3-azabicyclo(3:1:0)hexane was reduced with lithium aluminum hydride as described in Example 12. The base was recrystallized from ether-hexane, M.P. 147° C. The hydrochloride melts at 262° C.

EXAMPLE 18

6,6-Diphenyl-3-Methyl-3-Azabicyclo(3:1:0)Hexane

The cyclic imide, 6,6-diphenyl-2,4-dioxo-3-methyl-3- azabicyclo(3:1:0)hexane, was reduced with lithium aluminum hydride as described in Example 14. The free base was recrystallized from ether-hexane, M.P. 66° C. It forms a d-bitartrate that crystallizes as a dihydrate. This salt effervesces at 105° C. and melts at 145° C.

EXAMPLE 19

*6,6-Diphenyl-3,3-Dimethyl-3-Azabicyclo(3:1:0)Hexane Iodide*

The base from Example 18 on treatment with methyl iodide gave the above iodide, M.P. 239° C. (dec.). A sample converted to the picrate via the hydroxide melted at 165–166° C.

EXAMPLE 20

*6,6-Bis-(p-Tolyl)3,3-Dimethyl-3-Azabicyclo(3:1:0) Hexane Tosylate*

1.5 g. of the base, 6,6-bis-(p-tolyl)-3-methyl-3-azabicyclo(3:1:0)hexane obtained from lithium aluminum hydride reduction of the cyclic imide, was dissolved in 10 ml. of acetone and 1 g. of methyl-p-toluenesulfonate was added. The reaction mixture was warmed on the steam bath for half an hour and left standing overnight at room temperature. Fine needles were deposited. Recrystallization from methanolacetone gave needles, M.P. 186° C.

EXAMPLE 21

*6,6-o-Biphenylene-3-Azabicyclo(3:1:0)Hexane Spiropentamethyleneammonium Tosylate*

A solution of 4.8 g. (0.015 mole) of the base, cis-1,1-o-biphenylene - 2-piperidinomethyl-3-hydroxymethylcyclopropane, and 3 g. (0.016 mole) of p-toluenesulfonyl chloride in 100 ml. of triethylamine was refluxed for 8 hours. After the removal of the solvent under reduced pressure the residue was washed with ether. It was decolorized by activated carbon in water and crystallized from acetone. 4.9 g. (67%) of anhydrous product M.P. 250° C. was obtained.

EXAMPLE 22

*6,6-Diphenyl-3-Azabicyclo(3:1:0)Hexane Spirotetramethyleneammonium Tosylate*

A solution of 2 g. (0.00656 mole) of the base, cis-1,1-diphenyl - 2-pyrrolidinomethyl-3-hydroxymethylcyclopropane and 1.8 g. of p-toluenesulfonyl chloride in 25 ml. of triethylamine was refluxed for one hour. The solvent was removed under reduced pressure and the residue was washed with three 100 ml. portions of anhydrous ether. It was then triturated wtih dry acetone. The acetone extract on concentration yielded a product somewhat contaminated by triethylamine hydrochloride. Traces of impurity were removed by sublimation at 100° C. and 0.75 micron pressure. Recrystallization from acetone-methanol gave needles M.P. 170° C., 56% yield.

EXAMPLE 23

*6,6-Diphenyl-3-Azabicyclo(3:1:0)Hexane Spiro-(3'-Oxapentamethylene) Ammonium Tosylate*

A solution of 3.2 g. of the base, cis-1,1-diphenyl-2-morpholinomethyl-3-hydroxymethylcyclopropane and 1.5 g. of p-toluenesulfonyl chloride was warmed on the steam bath and the product was isolated and purified as in Example 22, M.P. 220° C.

EXAMPLE 24

*6,6-o-Biphenylene-3-Azabicyclo(3:1:0)Hexane Spiro(3'-Methylazapentamethylene) Ammonium Chloride*

A solution of 1.03 g. (0.003 mole) of the base, 1,1-o-biphenylene - 2 - N'-methylpiperazinomethyl-3-hydroxymethylcyclopropane, and 0.6 g. (0.0034 mole) of p-toluenesulfonyl chloride in 50 ml. of triethylamine was refluxed with stirring for 4 hours. The product was isolated by the method of Example 22. It was recrystallized from methanol-ether M.P. 282° C. In this instance this major product was shown by analysis to be the chloride.

Calculated for $C_{22}H_{26}N_2Cl$: C, 74.7; H, 7.4. Found: C, 74.9; H, 7.2.

From the mother liquors there was also isolated a small amount of the tosylate M.P. 250° C.

EXAMPLE 25

*6,6-Bis-(p-Tolyl)-3-Azabicyclo(3:1:0)Hexane Spirotetramethylene Ammonium Tosylate*

In 30 ml. of triethylamine was dissolved 1.7 g. (0.005 mole) of the base, 1,1-bis-(p-tolyl)-2-pyrrolidinomethyl-3-hydroxymethylcyclopropane, and 1.0 g. of p-toluenesulfonyl chloride. The solution was refluxed for 3 hours. The product was isolated and purified as in Example 22. Recrystallized from acetone-ether it melted at 170° C., yield 1.8 g. as hemi-hydrate.

EXAMPLE 26

*1-Methyl-6,6-o-Biphenylene-3-Azabicyclo(3:1:0) Hexane Spirotetramethylene Ammonium Tosylate*

In 30 ml. of triethylamine was dissolved 1.8 g. of the base, 1,1-o-biphenylene-2-pyrrolidinomethyl-3-methyl-3-hydroxymethylcyclopropane, and 2 g. of p-toluenesulfonyl chloride. After refluxing for 3 hours, the product was isolated and purified as in Example 22. Recrystallization from methanol-ether gave 1.9 g. of the product, M.P. 219° C.

EXAMPLE 27

*6,6-o-Biphenylene-3-Azabicyclo(3:1:0)Hexane-3,3-Spirotetramethylene Ammonium Tosylate*

In 100 ml. of triethylamine was dissolved 3.7 g. of 1,1-o - biphenylene - 2 - pyrrolidinomethyl-3-(cis)-hydroxymethylcyclopropane and 2.5 g. of p-toluenesulfonyl chloride. The solution was heated under reflux for 3.5 hours and allowed to stand overnight. The excess triethylamine was evaporated in vacuo and the residue was washed with ether to remove unreacted toluenesulfonyl chloride. The residue was then dissolved in hot water from which 3.3 g. of colorless crystals separated on cooling. These melted at 100–105° C., resolidified at 122° and finally melted at 190–191° C. Analysis showed these crystals to be those of a hemi-hydrate. When this hydrate was dissolved in warm acetone, the anhydrous salt M.P., 198–199° C. separated on cooling.

EXAMPLE 28

*6,6-o-Biphenylene-3-Azabicyclo(3:1:0)Hexane-3,3-Spiro-(3'-Oxapentamethylene) Ammonium Tosylate*

In 55 ml. of triethylamine was dissolved 1.5 g. of 1,1 - o - biphenylene-2-morpholinomethyl-3-cis-hydroxymethylcyclopropane and 1 g. of p-toluenesulfonyl chloride. The reaction and purification were by the method of Example 27. The quaternary tosylate crystallized from water with 2.5 mols of water of crystallization and in anhydrous form from acetone, M.P. 231–231.5° C.

EXAMPLE 29

*6,6-Bis-p-Tolyl-3-Azabicyclo(3:1:0)Hexane-3,3-Spiro-(3'-Oxapentamethylene) Ammonium Tosylate*

This compound was prepared from 1.9 g. of 1,1-bis-p-tolyl - 2 - morpholinomethyl-3-cis-hydroxymethylcyclopropane and 1 g. of p-toluenesulfonyl chloride in 55 ml. of dry triethylamine by the method of Example 22. The tosylate melted at 182–183° C.

EXAMPLE 30

*6,6-Diphenyl-2,4-Dioxo-3-Benzyl-3-Azabicyclo(3:1:0) Hexane*

1.72 g. of N-benzylmaleimide dissolved in 50 ml. of ether was added to a solution of 2 g. of diphenyldiazomethane in 100 ml. of ether and left at room temperature. Within half an hour a flocculant precipitate appeared, M.P. 134° C. This pyrazoline (2 g.) was dissolved in 50 ml. of benzene and refluxed for one hour. After cooling and concentration to half volume, 25 ml. of pentane was added. A crystalline product was obtained, which after recrystallization from benzene-pentane weighed 1.7 g. and melted at 192-3° C.

EXAMPLE 31

*6,6-Diphenyl-2,4-Dioxo-3-Benzyl-5-Methyl-3-Azabicyclo(3:1:0)Hexane*

3 g. of N-benzyl-citraconimide dissolved in 100 ml. of anhydrous ether was added to a solution of 5 g. of diphenyldiazomethane in 150 ml. of ether and kept overnight on the edge of the steam-bath. After the reaction mixture was decolorized, ether was blown off and 50 ml. of benzene was added. It was refluxed for 4 hours. On cooling and concentration pentane was added. The crystalline product was next extracted with boiling ethanol. On cooling and concentration colorless thick prisms were obtained. Recrystallization from methanol gave 4.5 g. of the product, M.P. 135° C.

EXAMPLE 32

*6,6-Bis-(Para-Chlorophenyl)-2,4-Dioxo-3-Benzyl-3-Azabicyclo(3:1:0)*

To 2 g. of 4,4'-dichlorodiphenyldiazomethane in 150 ml. of anhydrous ether was added 1 g. of N-benzylmaleimide dissolved in 50 ml. of anhydrous ether. The reaction mixture was maintained at reflux temperature for 10 minutes when a copious precipitate of pyrazoline, M.P. 130° C. (dec.) appeared. 2 g. of this pyrazoline product was refluxed in benzene for a half-hour. On concentration and cooling, pentane was added. The product was recrystallized from methanol, M.P. 213° C.

EXAMPLE 33

*6,6-Diphenyl-2,4-Dioxo-3-Carbamyl-3-Azabicyclo(3:1:0)Hexane*

To 5 g. of diphenyldiazomethane solution in 100 ml. of ether 3.3 g. of N-carbamylmaleimide suspended in 20 ml. of ether was stirred at room temperature for four hours. It was left overnight on the edge of the steam-bath. After the solution was decolorized, ether was blown off and 100 ml. of benzene was added. On extracting with boiling benzene, a product melting at 184° C. was obtained, yield 3 g.

EXAMPLE 34

*6,6Diphenyl-3-Benzyl-3-Azabicyclo(3:1:0)Hexane*

To a rapidly stirred solution of 10 g. (0.263 mole) of LiAlH$_4$ in one liter of anhydrous ether, 60 g. (0.17 mole) of 6,6 - diphenyl-2,4-dioxo-3-benzyl-3-azabicyclo(3:1:0) hexane was dropped portionwise from a powder funnel. After refluxing for 48 hours, the excess reagent was decomposed by water, and the base was extracted with an additional 200 ml. of ether. The combined ethereal layers were dried over anhydrous potassium carbonate. On evaporation of the solvent, a crystalline product was obtained. It was recrystallized from ether-pentane, M.P. 204° C.

EXAMPLE 35

*6,6-Diphenyl-3-Azabicyclo(3:1:0)Hexane Hydrochloride*

6 g. (0.016 mole) of 6,6-diphenyl-3-benzyl-3-azabicyclo (3:1:0)hexane hydrochloride (Example 34) was dissolved in 50 ml. of methanol and agitated with palladized charcoal at room temperature in an atmosphere of hydrogen. After the removal of the catalyst, the solution was concentrated to 15 ml. and crystallized from acetone-ether mixture. After recrystallization the M.P. was 256-7° C.

This application is a continuation in part of application Serial No. 704,869, filed December 24, 1957, and application Serial No. 618,423, filed October 26, 1956; both of which applications are now abandoned.

What we claim is:

1. A compound selected from the class consisting of the free base, its pharmaceutically acceptable acid addition salts and quaternary ammonium salts, said free base having the formula:

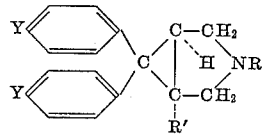

wherein R' is selected from the class consisting of lower alkyl and hydrogen, R is selected from the class consisting of lower alkyl, benzyl and hydrogen and Y is selected from the class consisting of hydrogen, methoxy, chloro and methyl, and said quaternary ammonium salts having the formula:

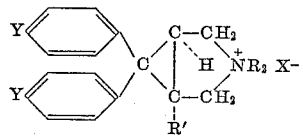

wherein R' and Y have the values defined above, R is a lower alkyl and NR$_2$ is selected from the class consisting of piperidino, pyrrolidino, morpholino and lower N'-alkylpiperazino, and X is the anion of a pharmaceutically acceptable acid.

2. A pharmaceutically acceptable salt of the 6,6-diphenyl - 3 - azabicyclo(3:1:0)hexane - 3,3 - diethylammonium ion.

3. A pharmaceutically acceptable salt of the 6,6-diphenyl - 3 - azabycyclo(3:1:0)hexane - 3,3 - spiro - pentamethyleneammonium ion.

4. 6,6-diphenyl-3-ethyl-3-azabicyclo(3:1:0)hexane.

5. A pharmaceutically acceptable salt of the 6,6-o-biphenylene - 1 - methyl - 3 - azabicyclo(3:1:0)hexane-3,3-spiro-tetramethyleneammonium ion.

6. A pharmaceutically acceptable salt of the 6,6-o-biphenylene - 3 - azabicyclo(3:1:0)hexane - 3,3-spiro-(3'-oxapentamethylene)ammonium ion.

7. The method of preparing 6,6-diphenyl-3-azabicyclo (3:1:0)hexane quaternary ammonium salts which comprises heating p-toluene sulfonyl chloride with 1,1-diphenyl-2-tertiary aminomethy - 3 - cis-hydroxymethylcyclopropane in the presence of a triethylamine as solvent and hydrogen acceptor and isolating the bicyclohexane quaternary salt from the reaction mixture.

No references cited.